(12) United States Patent
Bringert et al.

(10) Patent No.: US 8,959,023 B2
(45) Date of Patent: *Feb. 17, 2015

(54) VOICE CONTROL FOR ASYNCHRONOUS NOTIFICATIONS

(71) Applicant: Google Inc., Mountain View, CA (US)

(72) Inventors: Bjorn Erik Bringert, Bath (GB); Pawel Pietryka, London (GB); Peter John Hodgson, London (GB); Dave Burke, Palo Alto, CA (US); Henrique Penha, San Francisco, CA (US); Simon Tickner, Whitstable (GB); Richard Zarek Cohen, London (GB); Luca Zanolin, London (GB); Michael J. LeBeau, New York, NY (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/892,485

(22) Filed: May 13, 2013

(65) Prior Publication Data

US 2013/0253928 A1    Sep. 26, 2013

Related U.S. Application Data

(63) Continuation of application No. 13/626,375, filed on Sep. 25, 2012, now Pat. No. 8,468,022.

(60) Provisional application No. 61/542,055, filed on Sep. 30, 2011.

(51) Int. Cl.
*G10L 21/00* (2013.01)
*G10L 13/02* (2013.01)

(Continued)

(52) U.S. Cl.
CPC ............... *G10L 13/02* (2013.01); *G06F 3/167* (2013.01); *G10L 15/28* (2013.01);
(Continued)

(58) Field of Classification Search
CPC ............................... G10L 15/26; G06F 9/542
USPC ......................................... 704/257, 270, 275
See application file for complete search history.

(56) References Cited

U.S. PATENT DOCUMENTS 427,013 A * 4/1890 Richards ..................... 431/299
4,554,122 A * 11/1985 Allardice ..................... 264/130

(Continued)

FOREIGN PATENT DOCUMENTS

EP         2133869 A2    12/2009

OTHER PUBLICATIONS

PCT Search Report and Written Opinion, PCT International Application No. PCT/US2012/057584 dated Jan. 2, 2013.

*Primary Examiner* — Douglas Godbold
(74) *Attorney, Agent, or Firm* — McDonnell Boehnen Hulbert & Borghoff LLP

(57) ABSTRACT

A computing device may receive an incoming communication and, in response, generate a notification that indicates that the incoming communication can be accessed using a particular application on the communication device. The computing device may further provide an audio signal indicative of the notification and automatically activate a listening mode. The computing device may receive a voice input during the listening mode, and an input text may be obtained based on speech recognition performed upon the voice input. A command may be detected in the input text. In response to the command, the computing device may generate an output text that is based on at least the notification and provide a voice output that is generated from the output text via speech synthesis. The voice output identifies at least the particular application.

20 Claims, 15 Drawing Sheets

(51) Int. Cl.
  *G06F 3/16* (2006.01)
  *G10L 15/28* (2013.01)
  *H04M 1/725* (2006.01)
  *H04M 3/493* (2006.01)
  *H04L 12/58* (2006.01)
  *G10L 15/22* (2006.01)
  *G10L 15/26* (2006.01)

(52) U.S. Cl.
  CPC ..... *H04M 1/72519* (2013.01); *H04M 1/72552* (2013.01); *H04M 3/4936* (2013.01); *H04L 51/24* (2013.01); *G10L 2015/221* (2013.01); *G10L 15/265* (2013.01); *G10L 2015/223* (2013.01); *H04M 2250/74* (2013.01)
  USPC .................. 704/275; 704/270; 704/270.1

(56) References Cited

U.S. PATENT DOCUMENTS

| | | | |
|---|---|---|---|
| 7,042,753 B2* | 5/2006 | Horiguchi | 365/130 |
| 7,200,555 B1* | 4/2007 | Ballard et al. | 704/235 |
| 8,019,606 B2* | 9/2011 | Badger et al. | 704/270.1 |
| 8,219,407 B1* | 7/2012 | Roy et al. | 704/275 |
| 8,468,022 B2* | 6/2013 | Bringert et al. | 704/275 |
| 2008/0114603 A1* | 5/2008 | Desrochers | 704/275 |
| 2009/0006100 A1* | 1/2009 | Badger et al. | 704/275 |
| 2009/0249247 A1* | 10/2009 | Tseng et al. | 715/808 |
| 2009/0286514 A1* | 11/2009 | Lichorowic et al. | 455/412.2 |
| 2010/0197351 A1 | 8/2010 | Ewell, Jr. et al. | |
| 2010/0283735 A1 | 11/2010 | Kim et al. | |
| 2011/0223893 A1 | 9/2011 | Lau et al. | |
| 2011/0260964 A1 | 10/2011 | Mujkic | |
| 2011/0301958 A1 | 12/2011 | Brush et al. | |

* cited by examiner

VOICE CONTROL FOR ASYNCHRONOUS NOTIFICATIONS

CROSS-REFERENCE TO RELATED APPLICATIONS

This patent application is a continuation of U.S. application Ser. No. 13/626,375, filed on Sep. 25, 2012, which claims priority to U.S. Provisional Application No. 61/542,055, filed on Sep. 30, 2011, the contents of which applications are entirely incorporated herein by reference, as if fully set forth in this application.

BACKGROUND

Unless otherwise indicated herein, the materials described in this section are not prior art to the claims in this application and are not admitted to be prior art by inclusion in this section.

The use of and development of cellular communications has grown nearly exponentially in recent years due to technological improvements. These technological improvements have produced a smart phone category of mobile phone or devices with advanced features such messaging, email, and thousands of special user applications. As a result of these improvements, mobile devices have become one of the most ubiquitous devices.

Mobile devices typically notify the user of some asynchronous event, such as an incoming short message service (SMS) message, email, phone call, social network update, and the like. When such a notification occurs, the mobile user may not be able to easily interact with the mobile device by touch or even see the mobile device, because the user may be driving, walking, already engaged in a conversation, or otherwise occupied.

SUMMARY

In a first aspect, a method is provided. A computing device provides an audio signal indicative of a notification and automatically activates a listening mode. The notification indicates that an incoming communication can be accessed using a particular application on the computing device. A voice input is received during the listening mode. An input text is obtained based on speech recognition performed upon the voice input. A command is detected in the input text. An output text is generated in response to detecting the command in the input text. The output text is based on at least the notification. The computing device provides a voice output that identifies at least the particular application. The voice output is generated from the output text via speech synthesis.

In another aspect, a computer-readable storage medium is provided. The computer-readable storage medium has stored thereon instructions that, upon execution by a computing device, cause the computing device to perform operations. The operations include: receiving an incoming communication; generating a notification in response to receiving the incoming communication, wherein the notification indicates that the incoming communication can be accessed using a particular application on the computing device; providing an audio signal indicative of the notification and automatically activating a listening mode on the computing device; receiving a voice input during the listening mode; obtaining an input text based on speech recognition performed upon the voice input; detecting a command in the input text; generating an output text in response to detecting the command in the input text, wherein the output text is based on at least the notification; and providing a voice output that identifies at least the particular application, wherein the voice output is generated from the output text via speech synthesis.

In yet another aspect, a computing device is provided. The computing device includes an audio input unit, an audio output unit, at least one processor, and a memory. The memory stores instructions that, upon execution by the at least one processor, cause the computing device to perform operations. The operations include: receiving an incoming communication; generating a notification in response to receiving the incoming communication, wherein the notification indicates that the incoming communication can be accessed using a particular application on the computing device; providing, via the audio output unit, an audio signal indicative of the notification and automatically activating a listening mode on the computing device; receiving, via the audio input unit, a voice input during the listening mode; obtaining an input text based on speech recognition performed upon the voice input; detecting a command in the input text; generating an output text in response to detecting the command in the input text, wherein the output text is based on at least the notification; and providing, via the audio output unit, a voice output that identifies at least the particular application, wherein the voice output is generated from the output text via speech synthesis.

These as well as other aspects, advantages, and alternatives will become apparent to those of ordinary skill in the art by reading the following detailed description, with reference where appropriate to the accompanying drawings. Further, it should be understood that the disclosure provided in this summary section and elsewhere in this document is provided by way of example only and not by way of limitation.

DETAILED DESCRIPTION

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Figure 1:
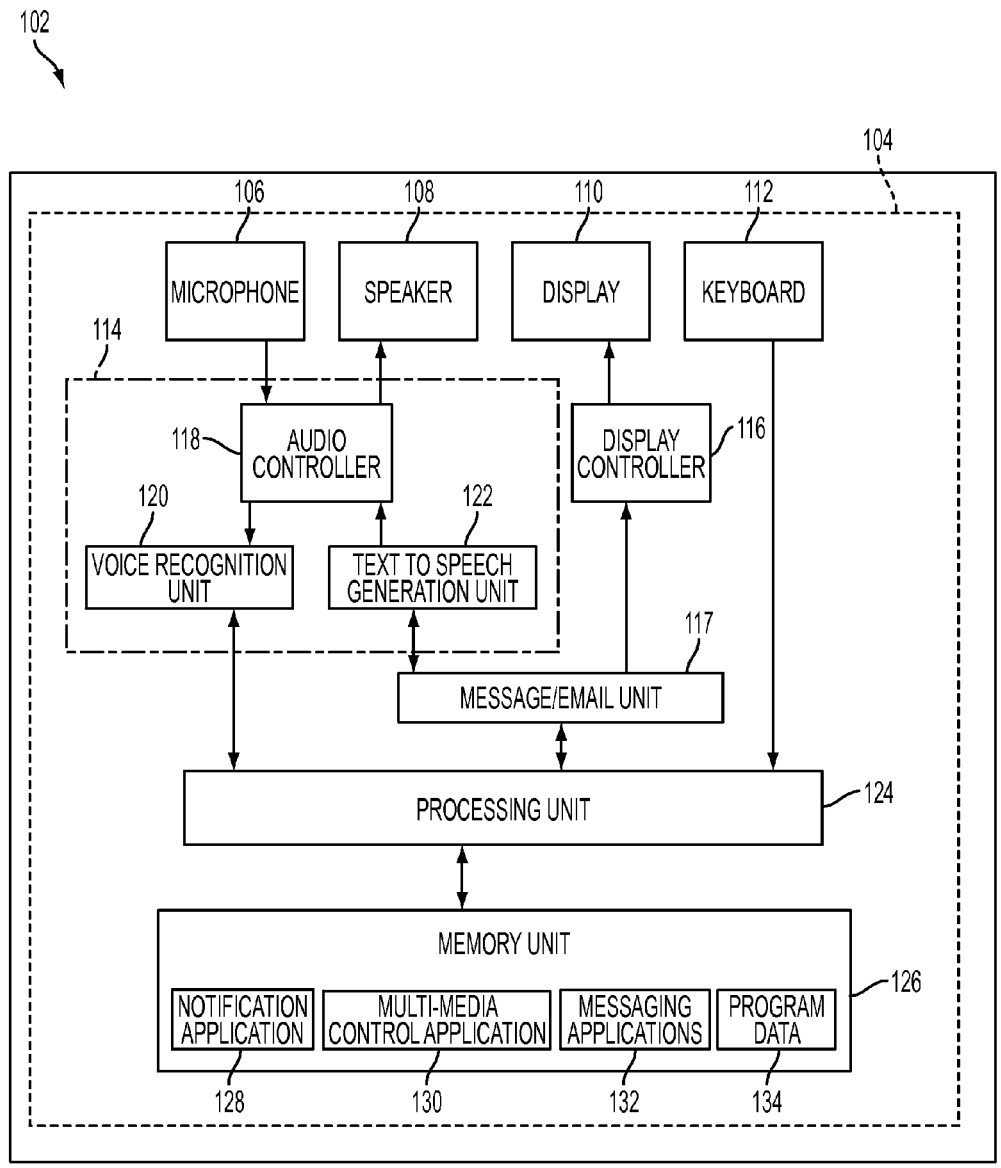
FIG. 1 is a schematic diagram illustrating an example embodiment of a mobile device.

FIG. 1 is a schematic diagram illustrating an example wireless personal computing device 102, hereafter referred to as mobile device, showing a physical arrangement and function of its components. Mobile device 102 includes a computing system 104 used for implementing a method for voice controlling asynchronous notifications, which may be generated in response to emails, voice mails, SMS messages, social network updates, and other incoming communications. As shown, computing system 104 includes a microphone 106, or an equivalent component for voice input, a speaker 108, or an equivalent component for voice output, a display unit 110, and a keyboard 112. Computing system 104 further includes an audio unit 114, a display controller 116, and a message/email unit 117. Audio unit 114 includes an audio controller 118, a voice recognition unit 120, and a text to speech generation unit 122. Computing system 104 further includes a processing unit 124 coupled to a memory unit 126. Processing unit 124 is further coupled to audio unit 114, display controller 116, and keyboard 112.

Processor unit 124, which may include one or more processors, is configured to execute instructions and to carry out operations associated with computing system 104. For example, using instructions retrieved from memory unit 126, the processor unit may control the reception and manipulation of input and output data between components of computing system 104. Processing unit 124 may include an integrated circuit that can be configured by the user, such as a field-programmable gate array (FPGA). The FPGA configuration is generally specified using a hardware description language (HDL). Processor unit 124 can be implemented on a single-chip, multiple chips or multiple electrical components. For example, various architectures can be used for processor unit 124, including dedicated or embedded processor or microprocessor (μP), single purpose processor, controller or a microcontroller (μC), application-specific integrated circuit (ASIC), reduced instruction set controller (RISC) processor, or any combination thereof, and so forth. Thus, processor unit 124 together with an operating system can operate to execute computer code and produce and use data.

Memory unit 126 generally provides a place to store computer code and data that are used by computing system 104. Memory unit 126 may include but not limited to non-volatile memory, such as read-only memory (ROM, flash memory, etc.), volatile memory, such as random-access memory (RAM), a hard disk drive and/or the like. In one example, the computer code stored in memory unit 126 includes code for a notification application 128, a multi-media control application 130, a set of messaging applications 132, and a program data unit 134.

Notification application 128 is configured to notify the user of any incoming messages and emails or already stored messages, emails, and voicemails upon activation of mobile device 102. More particularly, notification application 128 may generate a notification in response to mobile device 102 receiving an incoming communication. The notification indicates that the incoming communication can be accessed using a particular application on the mobile device 102, such as one of messaging applications 132. For example, an incoming email may result in notification application 128 generating a notification that a new email can be accessed using an email application. Notification application 128 may store a notification after it has been generated. In this way, a number of notifications can be accumulated, with each notification indicating that a particular incoming communication can be accessed using a particular application. Further, the accumulated notifications can relate to different applications. For example, there could be one or more notifications relating to emails that can be accessed by an email application, one or more notifications relating to SMS messages that can be accessed by an SMS application, one or more notifications relating to voicemails that can be accessed by a voicemail application, etc.

Notification application 128 enables access to these notifications via voice commands, and to provide responses to the notifications in any media type selected by the user. Notification application 128 is configured to respond to voice commands received from the user, invoking voice recognition unit 120, text-to-speech generation unit 122, and message/email unit 117, as needed. Multi-media control application 128 is configured to communicate or pass data between components of computing system 104 and even reformat the data for compatibility between these components.

Figure 2:
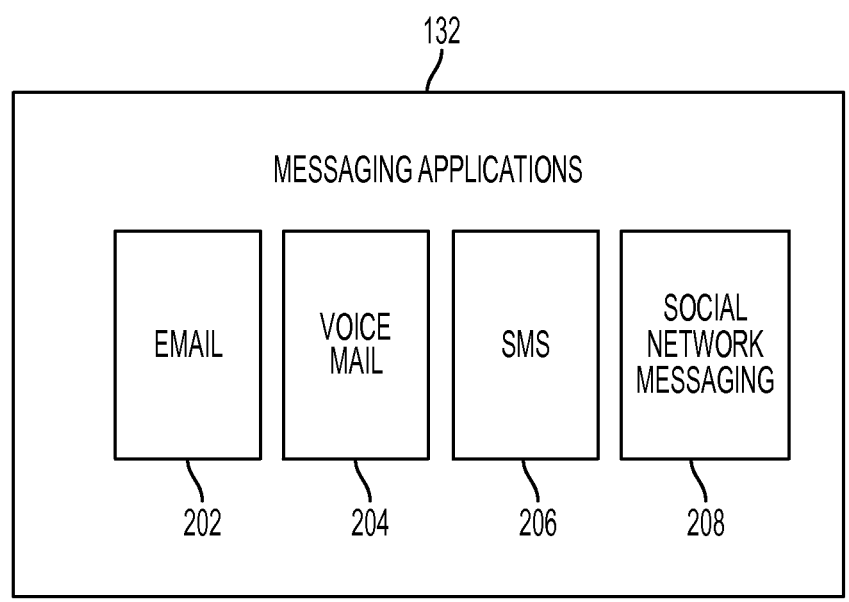
FIG. 2 is a block diagram illustrating example embodiments of a plurality of messaging applications.

Referring to FIG. 2, messaging applications 132 may include an email application 202, a voicemail application 204, an SMS application 206, a social network message application 208. Set of messaging applications 132 may also include other applications for processing different types of messages such as a multi-media messaging service (MMS) application, a visual voice mail application, an instant messaging application (all not shown), and the like. Email application 202 interacts with an email system that may include a Simple Mail Transfer Protocol (SMTP) server for handling emails. Voicemail application 204 may interact with a voicemail server, and provides that message retrieval functionality for the user. SMS application 206 interacts with an SMS system that may include an SMS Center (SMSC) that provides a store and forward function in a centralized system in a mobile telephone network.

In some example embodiments, notification application 128, multi-media control application 130, messaging applications 132, can be configured to operate with program data or data storage unit 134 on a suitable operating system (not shown). Operating systems are generally well known and will not be described in greater detail. By way of example, the suitable operating system may correspond to Windows 7, Mac OS, Google Chrome OS, Palm OS Cobalt (6.0), Android, Symbian Belle, BlackBerry OS, and the like. The suitable operating system can also be a special purpose operating system, such as may be used for limited purpose appliance-type computing devices.

Figure 3:
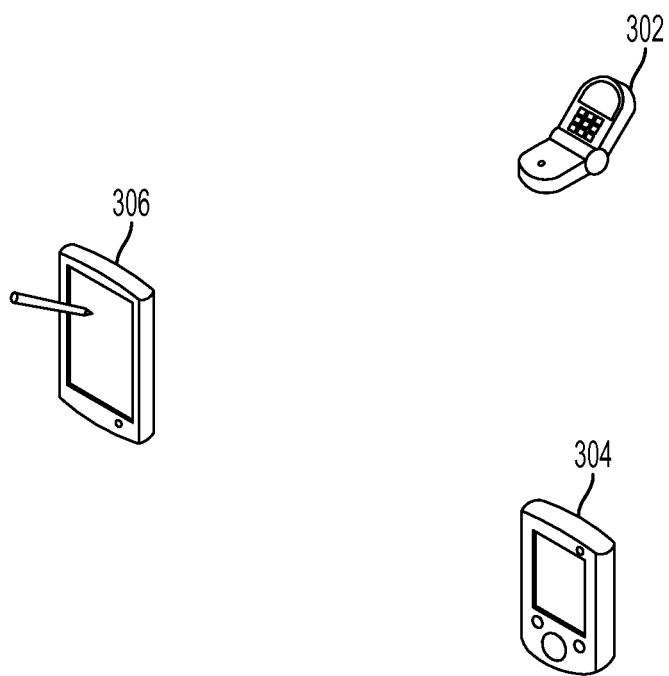
FIG. 3 illustrates a plurality of example embodiments of computing devices, which include operating systems in which a method for voice controlling asynchronous notifications can be performed.

As shown in FIG. 3, mobile device 102 may be a small-form factor portable (or mobile) electronic device such as a cell phone 302, a personal data assistant (PDA) 304, a tablet or notebook 306, or a hybrid device that includes any of the above functions. User device 102 may be capable of communicating via a wireless connection using any type of wireless-based communication protocol, a wired connection using any type of wire-based communication protocol, or a combination of one or more wireless connections and one or more wired connections.

During operation, in one embodiment, microphone 106 captures a voice input uttered by a user, and sends it to audio controller 118, which in turn forwards it to voice recognition unit 120, where the voice input is converted from analogue signals to digital signals. Voice recognition unit 120 may perform speech recognition on the digital signals to obtain a recognition result, for example, in the form of text. Alternatively or additionally, voice recognition unit 120 may communicate with another device, such as a server, for speech recognition. For example, voice recognition unit 120 may send the digital signals representing a voice input to a server that is configured to perform speech recognition and receive back from the server a recognition result, for example, in the form of text.

Processing unit 124 is configured, via multi-media control application 130, to compare the recognition result to a dictionary of digital words or phrases stored in memory 126. In this way, processing unit 124 can identify a command in a user's voice input. Once a match is found, processing unit 124 can generate an answer, a default instruction, or a query by providing a digital text to text-to-speech unit 122. Based on the digital text, text-to-speech unit 122 may generate a corresponding spoken output, via speech synthesis, which is provided to the user via audio controller 118 and speaker 108. It is also possible for the spoken output to be generated by another device, such as a text-to-speech server. For example, processing unit 124 may provide a text to the text-to-speech server and receive a spoken output generated by the server that can be provided through speaker 108. In addition to or instead of a spoken output, the answer, default instruction, or query may be provided on display 110 via display controller 116.

In another embodiment, in reaction to a voice command by the user to read a particular message or email, processing unit 124 is configured, via multi-media control application 130, to retrieve the particular message or email, and provide it to text-to-speech unit 122 to generate a corresponding spoken version that is provided through speaker 108.

As a general matter, when computing device 104 produces a notification, it may also output an audio prompt. The audio prompt could be a spoken output, such as "tell me more" for example, to prompt the user to utter a verbal instruction or command. The audio prompt could also be some other type of audible output, such as a tone or a ping sound. Alternatively, computing device 104 may not produce a prompt, but may remain silent while listening for a user's voice command. Following the audio prompt, computing system 104 may automatically activate audio unit 114 for a limited period of time, e.g., ten (10) seconds, to provide a "listening" mode.

During the listening mode, the computing system 104 may receive a voice input that includes a command. For example, if computing system 104 recognizes a verbal "Read" action command, it may read out the content of the notification. The content that is read out could include, for example, an identification of the particular application that can be used to access the incoming communication that triggered the notification. Computing system 104 could then receive another voice input that identifies the particular application and, in response, computing system 104 could invoke the particular application. Computing system 104 may invoke the application in a voice mode that supports voice controlled actions, such as "Reply" and "Forward" for the message, email, or voicemail that triggered the notification.

Figure 4:
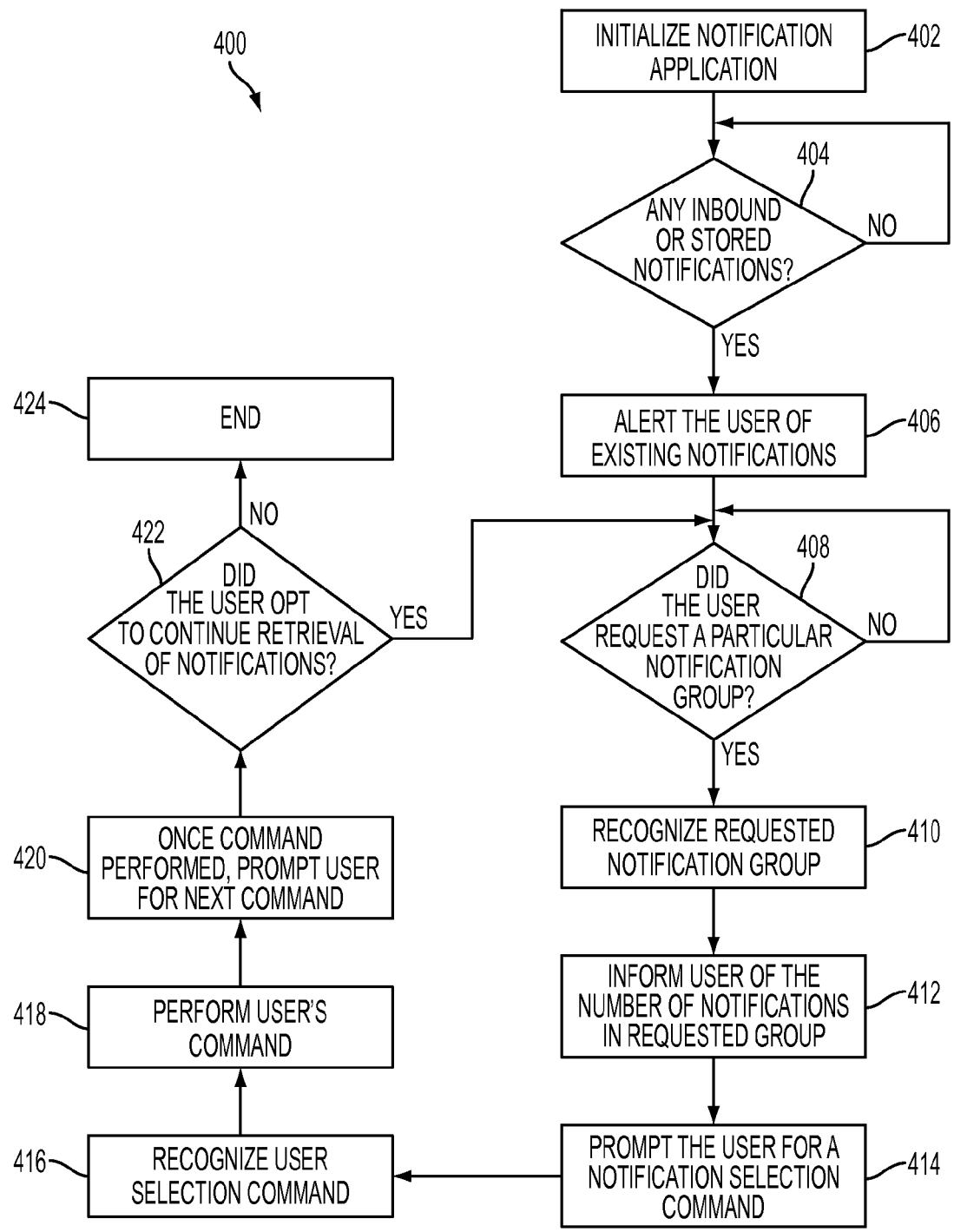
FIG. 4 is a flow diagram illustrating an example method for voice controlling asynchronous notifications.
Figure 5A:
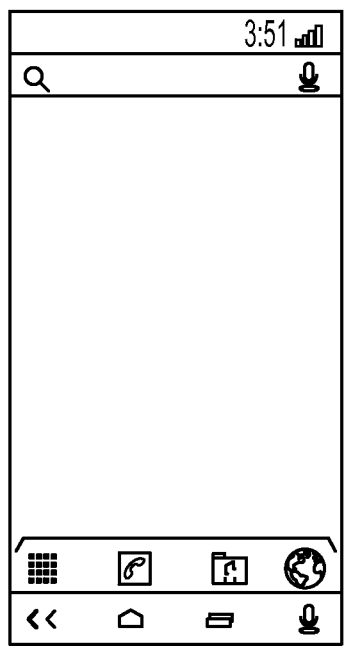
FIGS. 5A-5T illustrates a set of example interface screens presented sequentially on a display of the mobile device, as well as an example sequence of voice inputs from a user of the mobile device, voice outputs provided by the computing device, and corresponding actions performed by the mobile device.

Now referring to FIG. 4, a flow diagram 400 illustrates an example method 402 for voice controlling asynchronous notifications. Method 402 will be discussed hereafter in conjunction with FIGS. 5A-5T, which illustrate an example sequence of interface screens on a display of a mobile device, as well as voice inputs from a user of the mobile device (indicated by the upper-level balloons) and voice outputs provided by the mobile device (indicated by the lower-level balloons).

Referring to FIG. 4 and FIGS. 5A-5E, at step 402, notification application 128 is initiated or enabled, which in turn sets mobile device 102 into a "listening" mode, as illustrated by interface screen 5A, by activating audio unit 114, more specifically by activating voice recognition unit 120. Upon detection of an incoming or inbound notification (i.e., a notification generated in response to an incoming communication), at step 404, processing unit 124 turns on microphone 106 for a limited period of time, for example 10 seconds, and provides an audio signal via speaker 108, such as a ping, to alert the user of the inbound notification, at step 406.

Figure 5B:

As additional notifications are generated, processing unit 124 provides another interface screen, illustrated by FIG. 5B, that displays a number indicative of the total number of new or current notifications. In response to a spoken user command, such as "What's New," processing unit 124 generates another interface screen, illustrated by FIG. 5C, to display groups of the new notifications by application type or group, such as emails, chats, messaging, and missed calls. Processing unit 124 then triggers audio unit 114 to verbally list the displayed application types. For example, the user may hear "You have emails, messages, voicemails, and missed calls." This voice output may be accomplished by processing unit 124 generating an output text that is based on the notifications, for example, an output text that identifies the particular applications to which the notifications relate. Processing unit 124 then causes the voice output to be generated from the output text via speech synthesis (by text-to-speech unit 122 and/or by another device) and provided through speaker 108.

Figures 5C, 5D:
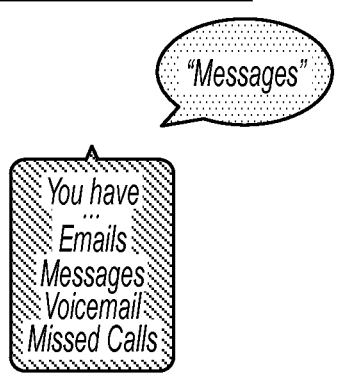
Figure 5E:
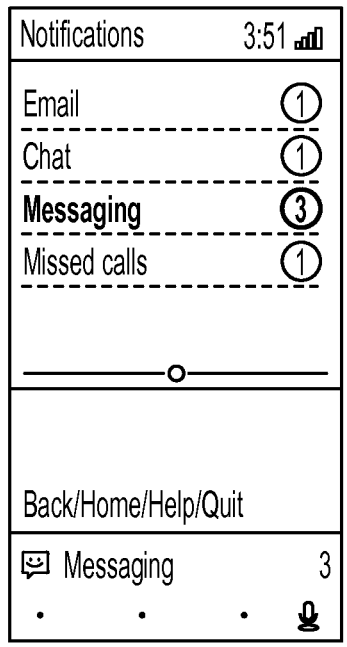
Figure 5F:
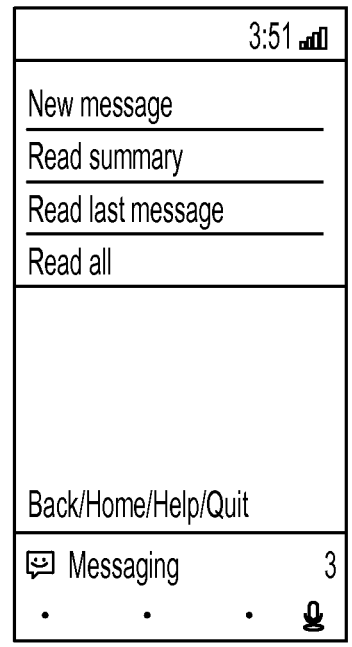
Figure 5F:
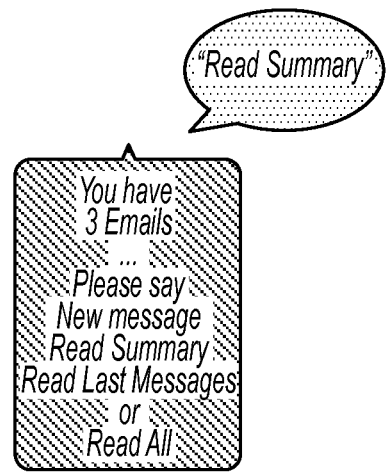

At step 408, processing unit 124 determines, via voice recognition unit 120, whether the user has uttered a particular command directed to one of the application types displayed. Upon detection of the particular command, such as "Messages," processing unit 124 generates another interface screen, illustrated by FIG. 5D, which highlights the recognized application type, at step 410. As shown in FIG. 5D, the highlighted application is "Messaging." Another indication of the recognized "Messaging" application may be displayed near the audio input icon (a stylized microphone), as shown in FIG. 5E, when the application is available to receive voice input. Thus, the application that is identified in the user's voice input may be invoked in a voice mode.

FIGS. 5F-5J illustrate example functions of the "Messaging" application in voice mode. Following the highlighting of the recognized application type, processing unit 124 generates another interface screen, illustrated by FIG. 5F, that lists key available commands. The 5F interface screen also shows an application bar that lists the application name and number of items unread. The available key commands may include references to "New Message," "Read summary," "Read last message," and "Read all" commands. Processing unit 124 also triggers audio unit 114 to voice highlight the number of unread items and the choices available to the user, at step 412. For example, the user may hear a device voice prompt indicating the number of items and urges the user to choose one of the above listed key commands, at step 414.

Figures 5G, 5H:
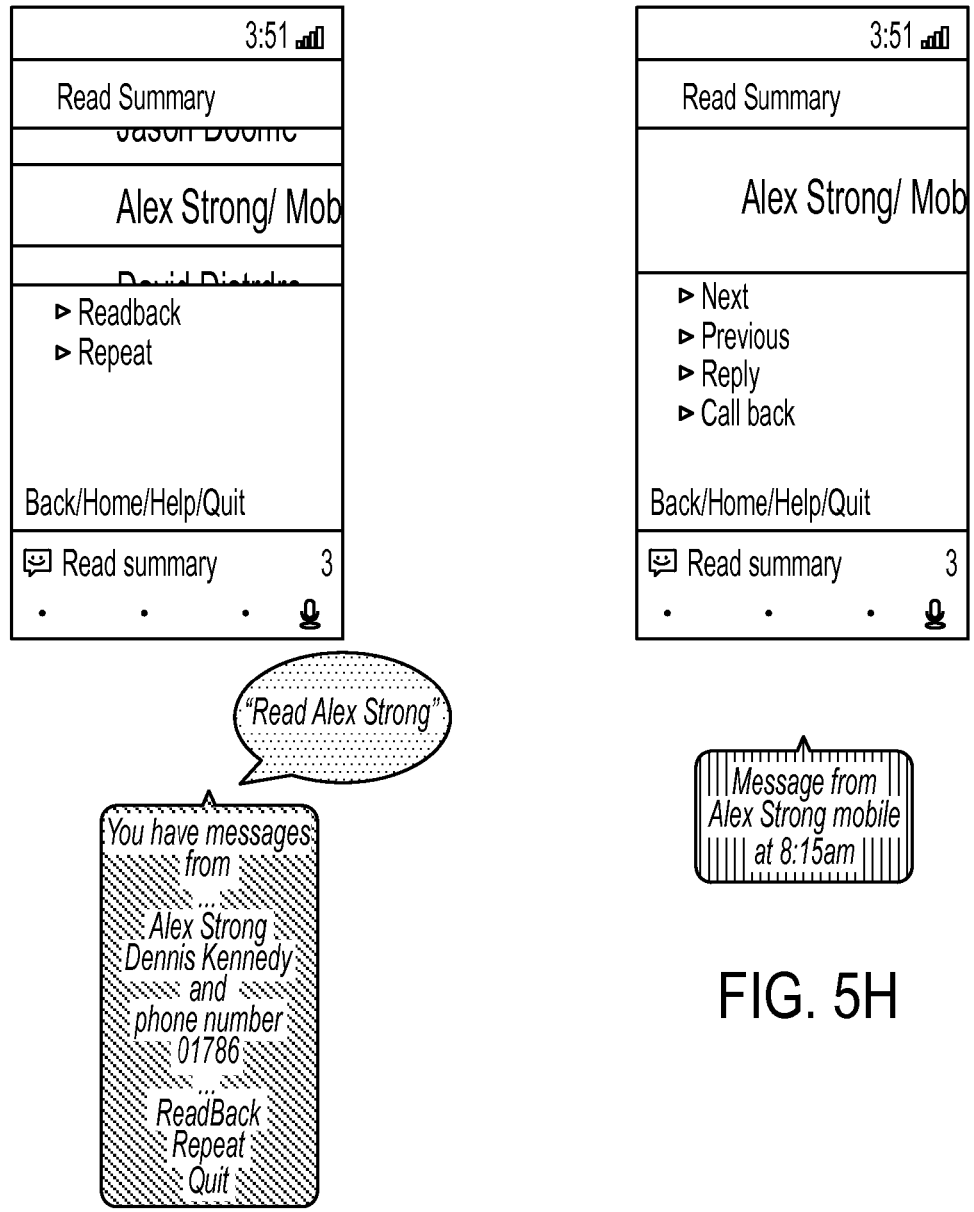
Figure 5J:
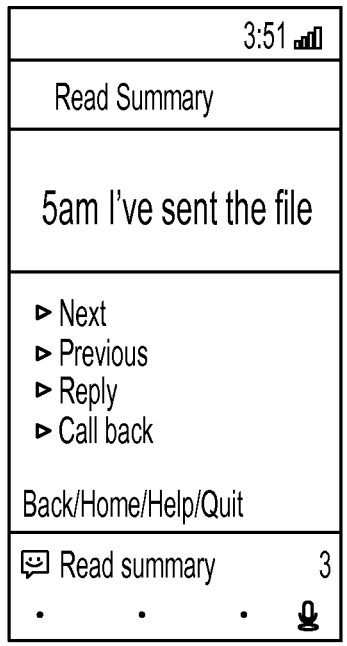
Figure 5J:
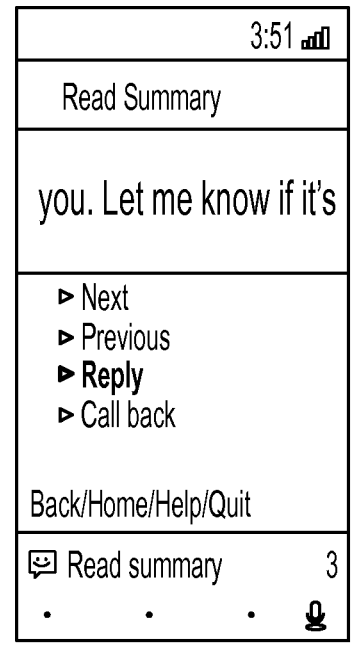
Figure 5I:
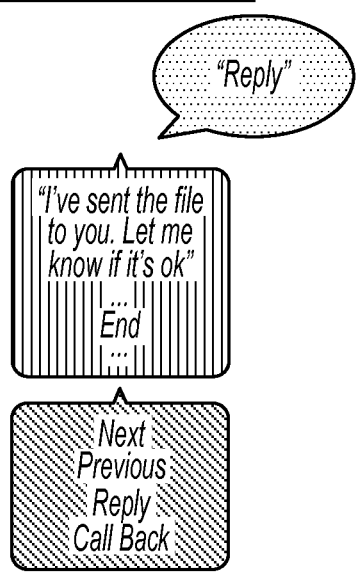

Upon recognition of a responsive voice command, such as "Read summary" for example, processing unit 124 generates another interface screen, illustrated by FIG. 5G, to display a list of sender names of the unread items. The interface screen may show the sender names in larger types in a vertical scrolling view. Additionally, processing unit 124 triggers audio unit 114 to indicate verbally the sender names and available commands. For example, the user may hear "You have messages from Alex Strong, Dennis Kennedy, and phone number 01786." Processing unit 124 further triggers audio unit 114 to verbally indicate the available commands. In response to the user electing to hear the message send by Alex Strong, processing unit 124 generates another interface screen, illustrated by FIG. 5H, to show Alex Strong's messages in a closed caption view that scrolls from left to right as the text-to-speech unit 122 reads the messages. Moreover, the user is provided with the flexibility to skip back and forth through the list of messages, and to respond to one or more of these messages. In one embodiment, prior to reading a message, audio unit 114 states the sender's address and the time of the message, as shown in FIG. 5H. Processing unit 124 then triggers a reading of the message, as illustrated in FIG. 5I. In this example, text-to-speech unit 122 reads out the message, which states "I've sent the file to you. Let me know if it's OK." Once the message has been read, processing unit 124 marks the end of the message and prompts the user with relevant commands such as "Next," "Previous," "Reply," and "Call Back." Upon detection of a user command, at step 416, processing unit 124 generates another interface screen that highlights the detected user command, such as "Reply," as shown in FIG. 5J.

Figure 5K:
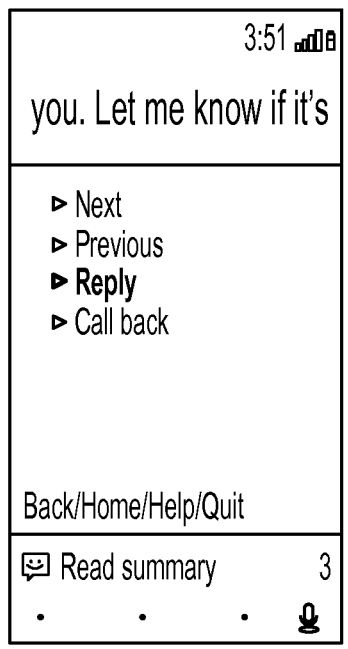
Figure 5L:
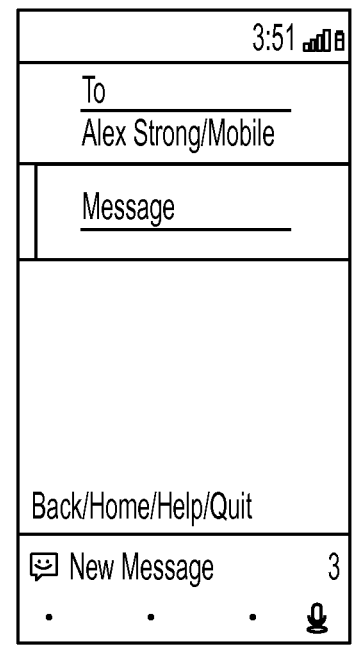
Figure 5N:
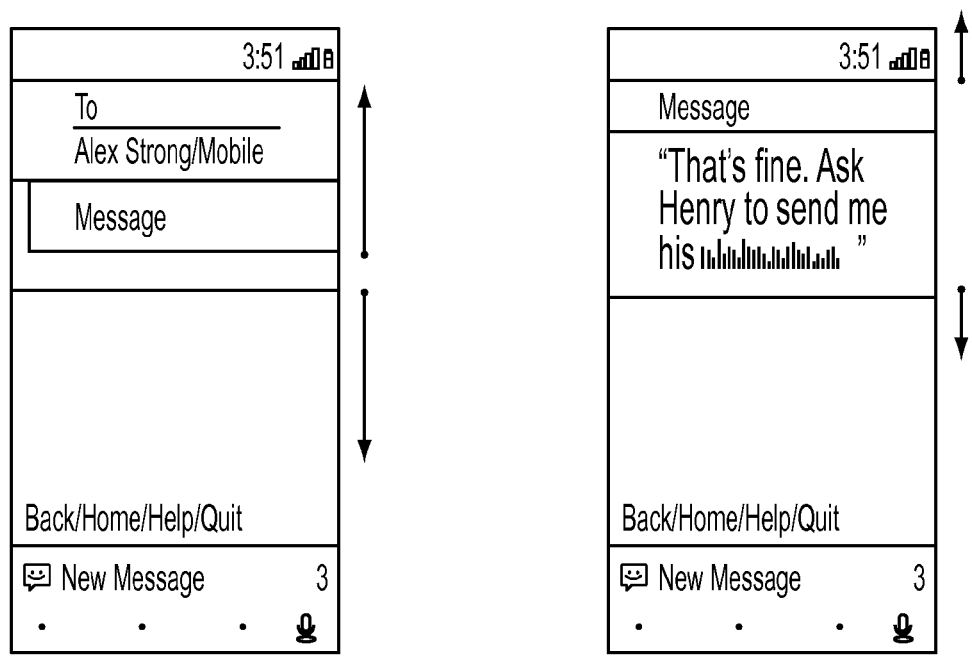
Figure 5M:
Figures 5O, 5P:
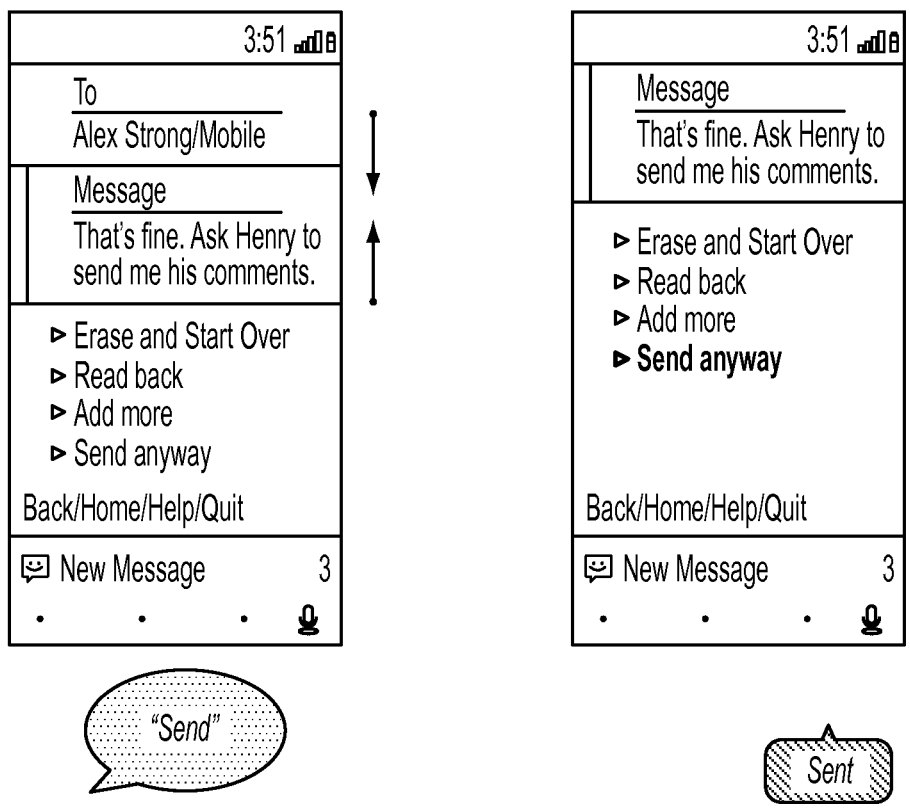

Now referring to FIGS. 5K-5O, processing unit 124 is configured to transition to a form-filling function to perform the user's command, at step 418. FIG. 5K illustrates a screen transition to the form-filling function. FIG. 5L shows the screen after the transition, in this case, to a reply form. The reply form automatically includes a "To" field completed with the recipient address, and the Reply message body is ready to be filled with the user's dictation. Once the Reply form is ready, processing unit 124 is configured to inform the user that mobile device 102 is ready for the dictation of the Reply message, and request that the user starts dictation. Upon recognition of the Reply dictation, processing unit 124 converts the corresponding audio analog signal into a written message, and the message field, to be filled, is automatically opened at the top of the interface screen, illustrated by FIG. 5M, pushing the other displayed fields off-screen. Upon detection of the reply message uttered by the user, such as "That's fine. Ask Henry to send me his comments," processing unit 124 generates another interface screen, illustrated in FIG. 5N, that includes the recognized text version of the reply message. As illustrated in FIG. 5O, processing unit 124 is then configured to hold the recognized text area of the displayed interface screen in a selected state that allows the user to modify it, as needed. For example, in one embodiment, the user may elect to have the recognized text read back to confirm that the recognized text does conform to the detected verbal reply version, and to add extra phrases if desired or required using the same process. The user may also be presented with options for disposition of the message, such as Send, Save, or Discard. In this example, the user provides a spoken "Send" command.

Figure 5Q:
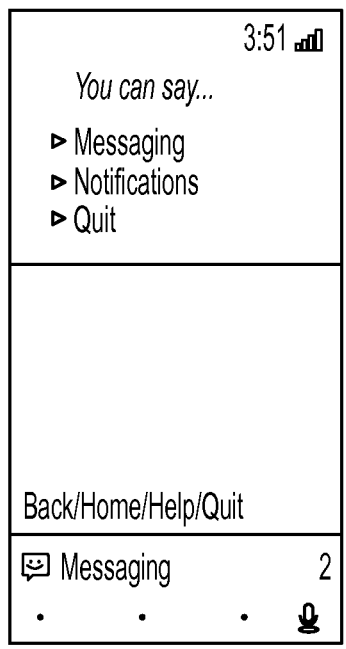
Figure 5Q:
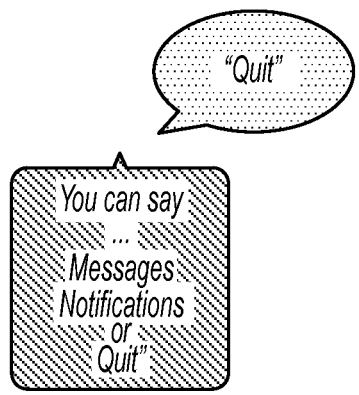
Figure 5R:
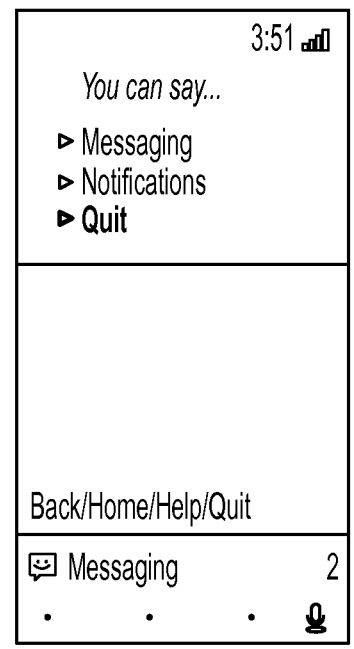
Figure 5S:
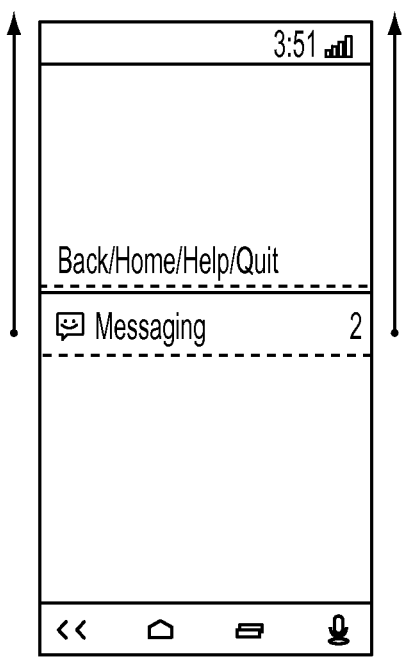
Figure 5T:
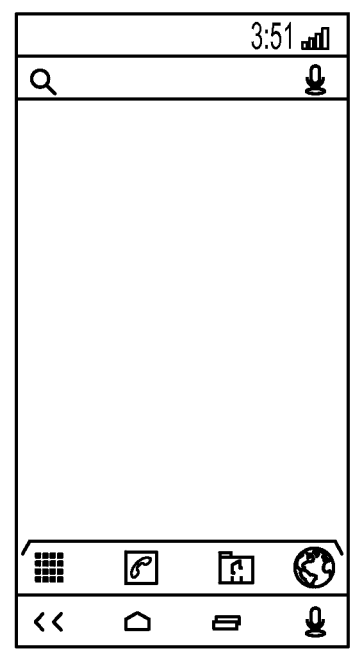

As shown in FIG. 5P, the display can change in response to the user's "Send" command. In addition, the device can provide a spoken acknowledgement, such as "Sent," to the user. As shown in FIG. 5Q, processing unit 124 is then configure to prompt the user to determine whether he/she wishes to continue retrieving the remaining notifications or quit the notification retrieval session, at step 420. As such, because the user started interacting with mobile device 102 in the Notifications session, he/she may have the option to continue retrieving messages associated with the same application, to switch applications, or to quit, at step 422. These options may be spoken to the user as: "You can say Messages, Notifications, or Quit." In response to a "Quit" command, processing unit 124 highlights the detected "Quit" command in another interface screen, illustrated in FIG. 5R, and may proceed to transition display 110 to a starting screen by pushing the voice portion up and replacing it with a touch portion, at shown in FIG. 5S. Subsequently, the notifications portion of display 110 returns to the listening mode, as shown in FIG. 5T, at step 424.

Figure 6:
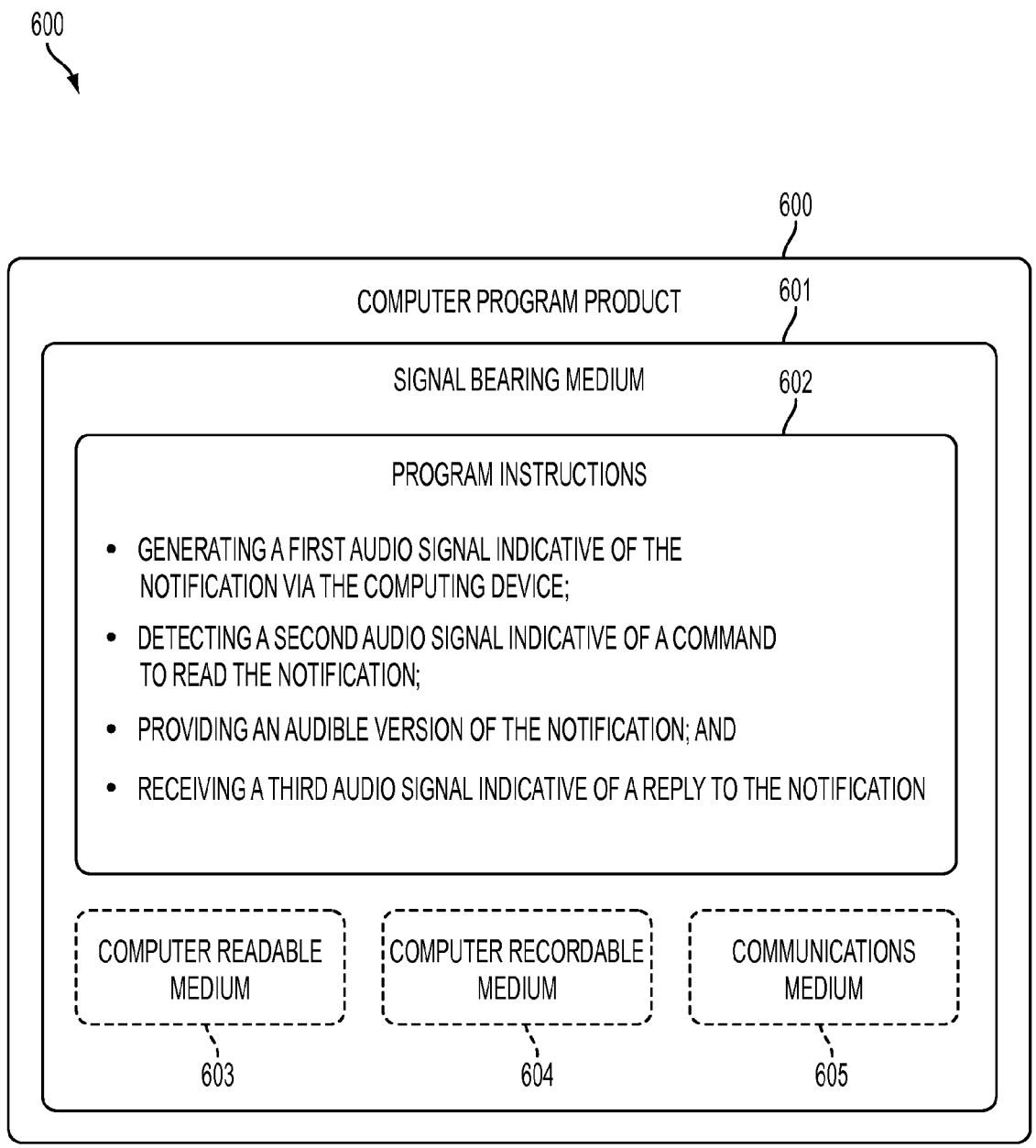
FIG. 6 illustrates a schematic diagram illustrating a conceptual partial view of an example computer program associated with the methods of FIG. 4.

In some embodiments, the disclosed methods may be implemented as computer program instructions encoded on a computer-readable storage media in a machine-readable format. FIG. 6 is a schematic illustrating a conceptual partial view of an example computer program product 600 that includes a computer program for executing a computer process on a computing device, arranged according to at least some embodiments presented herein. In one embodiment, the example computer program product 600 is provided using a signal bearing medium 601. Signal bearing medium 601 may include one or more programming instructions 602 that, when executed by one or more processors may provide functionality or portions of the functionality described above with respect to FIGS. 1-5. Thus, for example, referring the embodiment shown in FIG. 4, one or more features of one or more blocks 402-424 may be undertaken by one or more instructions associated with signal bearing medium 601.

In some examples, signal bearing medium 601 may encompass a non-transitory computer-readable medium 603, such as, but not limited to, a hard disk drive, a Compact Disc (CD), a Digital Video Disk (DVD), a digital tape, memory, etc. In some implementations, signal bearing medium 601 may encompass a computer recordable medium 604, such as, but not limited to, memory, read/write (R/W) CDs, R/W DVDs, etc. In some implementations, signal bearing medium 601 may encompass a communications medium 605, such as, but not limited to, a digital and/or an analog communication medium (e.g., a fiber optic cable, a waveguide, a wired communications link, a wireless communication link, etc.). Thus, for example, signal bearing medium 601 may be conveyed by a wireless form of the communications medium 605 (e.g., a wireless communications medium conforming with the IEEE 802.11 standard or other transmission protocol).

The one or more programming instructions 602 may be, for example, computer executable and/or logic implemented instructions. In some examples, a computing device such as computing device 600 of FIG. 6 may be configured to provide various operations, functions, or actions in response to programming instructions 602 conveyed to computing device 600 by one or more of the computer readable medium 603, computer recordable medium 604, and/or communications medium 605.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
providing, by a computing device, an audio signal indicative of at least one notification in a plurality of notifications and automatically activating a listening mode on the computing device, wherein the plurality of notifications relate to a plurality of incoming communications and a plurality of different applications on the computing device, such that each notification in the plurality of notifications indicates that a respective incoming communication in the plurality of incoming communications can be accessed using a respective application in the plurality of different applications;

receiving a voice input during the listening mode;
obtaining an input text based on speech recognition performed upon the voice input;
detecting a command in the input text;
generating an output text in response to detecting the command in the input text, wherein the output text is based on the plurality of notifications; and
providing, by the computing device, a voice output that identifies each of the different applications prior to receiving a selection of an application in the plurality of different applications.

2. The method of claim 1, further comprising:
after providing the voice output, receiving an additional voice input;
obtaining an additional input text based on speech recognition performed upon the additional voice input;
determining that the additional input text identifies a particular application in the plurality of different applications; and
in response to determining that the additional input text identifies the particular application, invoking the particular application.

3. The method of claim 2, wherein invoking the particular application comprises invoking the particular application in a voice mode.

4. The method of claim 1, wherein the plurality of different applications includes at least one of an email application, a voicemail application, a short message service (SMS) application, a social network messaging application, a multi-media messaging service (MMS) application, or an instant messaging application.

5. The method of claim 1, further comprising:
receiving, by the computing device, the plurality of incoming communications; and
generating, by the computing device, the plurality of notifications such that each notification in the plurality of notifications is generated in response to receiving a respective incoming communication in the plurality of incoming communications.

6. The method of claim 5, wherein the plurality of notifications includes at least one newly-generated notification and one or more previously-generated notifications, and wherein the audio signal is indicative of the at least one newly-generated notification.

7. The method of claim 1, further comprising:
displaying an indication of a total number of notifications in the plurality of notifications.

8. The method of claim 1, further comprising:
displaying identifications of each of the different applications and indications of how many notifications in the plurality of notifications relate to each of the different applications.

9. A computer-readable medium having stored thereon program instructions that, upon execution by a computing device, cause the computing device to perform operations comprising:
providing an audio signal indicative of at least one notification in a plurality of notifications and automatically activating a listening mode on the computing device, wherein the plurality of notifications relate to a plurality of incoming communications and a plurality of different applications on the computing device, such that each notification in the plurality of notifications indicates that a respective incoming communication in the plurality of incoming communications can be accessed using a respective application in the plurality of different applications;
receiving a voice input during the listening mode;
obtaining an input text based on speech recognition performed upon the voice input;
detecting a command in the input text;
generating an output text in response to detecting the command in the input text, wherein the output text is based on the plurality of notifications; and
providing a voice output that identifies each of the different applications prior to receiving a selection of an application in the plurality of different applications.

10. The computer-readable medium of claim 9, wherein the operations further comprise:
after providing the voice output, receiving an additional voice input;
obtaining an additional input text based on speech recognition performed upon the additional voice input;
determining that the additional input text identifies a particular application in the plurality of different applications; and
in response to determining that the additional input text identifies the particular application, invoking the particular application.

11. The computer-readable medium of claim 10, wherein invoking the particular application comprises invoking the particular application in a voice mode.

12. The computer-readable medium of claim 9, wherein the plurality of different applications includes at least one of an email application, a voicemail application, a short message service (SMS) application, a social network messaging application, a multi-media messaging service (MMS) application, or an instant messaging application.

13. The computer-readable medium of claim 9, wherein the operations further comprise:
displaying an indication of a total number of notifications in the plurality of notifications.

14. The computer-readable medium of claim 9, wherein the operations further comprise:
displaying identifications of each of the different applications and indications of how many notifications in the plurality of notifications relate to each of the different applications.

15. A computing device, comprising:
an audio input unit;
an audio output unit;
a display;
at least one processor; and
a memory, wherein the memory stores instructions that upon execution by the at least one processor cause the computing device to perform operations comprising:
providing, via the audio output unit, an audio signal indicative of at least one notification in a plurality of notifications and automatically activating a listening mode on the computing device, wherein the plurality of notifications relate to a plurality of incoming communications and a plurality of different applications on the computing device, such that each notification in the plurality of notifications indicates that a respective incoming communication in the plurality of incoming communications can be accessed using a respective application in the plurality of different applications;
receiving, via the audio input unit, a voice input during the listening mode;
obtaining an input text based on speech recognition performed upon the voice input;
detecting a command in the input text;

generating an output text in response to detecting the command in the input text, wherein the output text is based on the plurality of notifications;

providing, via the audio output unit, a voice output that identifies each of the different applications prior to receiving a selection of an application in the plurality of different applications.

16. The computing device of claim 15, wherein the operations further comprise:

after providing the voice output, receiving an additional voice input via the audio input unit;

obtaining an additional input text based on speech recognition performed upon the additional voice input;

determining that the additional input text identifies a particular application in the plurality of different applications; and in response to determining that the additional input text identifies the particular application, invoking the particular application.

17. The computing device of claim 16, wherein invoking the particular application comprises invoking the particular application in a voice mode.

18. The computing device of claim 15, wherein the plurality of different applications includes at least one of an email application, a voicemail application, a short message service (SMS) application, a social network messaging application, a multi-media messaging service (MMS) application, or an instant messaging application.

19. The computing device of claim 15, wherein the operations further comprise:

displaying, on the display, an indication of a total number of notifications in the plurality of notifications.

20. The computing device of claim 15, wherein the operations further comprise:

displaying, on the display, identifications of each of the different applications and indications of how many notifications in the plurality of notifications relate to each of the different applications.

* * * * *